(12) United States Patent
Kreusch et al.

(10) Patent No.: US 7,979,529 B2
(45) Date of Patent: Jul. 12, 2011

(54) METHOD AND TELECOMMUNICATIONS SYSTEM FOR MONITORING A DATA FLOW IN A DATA NETWORK

(75) Inventors: Norbert Kreusch, Neuried (DE); Wolfgang Pfähler, Dachau (DE); Helmut Stifter, München (DE)

(73) Assignee: Siemens Aktiengesellschaft, Munich (DE)

( * ) Notice: Subject to any disclaimer, the term of this patent is extended or adjusted under 35 U.S.C. 154(b) by 1186 days.

(21) Appl. No.: 10/472,607

(22) PCT Filed: Mar. 7, 2002

(86) PCT No.: PCT/EP02/02524
§ 371 (c)(1),
(2), (4) Date: Sep. 22, 2003

(87) PCT Pub. No.: WO02/082728
PCT Pub. Date: Oct. 17, 2002

(65) Prior Publication Data
US 2004/0181599 A1    Sep. 16, 2004

(30) Foreign Application Priority Data
Mar. 21, 2001   (EP) ..................... 01107063

(51) Int. Cl.
*G06F 15/173* (2006.01)
(52) U.S. Cl. ...................................... 709/224
(58) Field of Classification Search ............. 379/70, 379/133; 709/217–219, 223–232
See application file for complete search history.

(56) References Cited

U.S. PATENT DOCUMENTS

| | | | |
|---|---|---|---|
| 6,182,075 B1 * | 1/2001 | Hsu | 707/10 |
| 6,282,180 B1 * | 8/2001 | Paneth et al. | 370/330 |
| 6,373,838 B1 * | 4/2002 | Law et al. | 370/352 |
| 6,498,843 B1 * | 12/2002 | Cox | 379/207.02 |
| 6,983,317 B1 * | 1/2006 | Bishop et al. | 709/223 |
| 7,055,174 B1 * | 5/2006 | Cope et al. | 726/22 |
| 7,151,772 B1 * | 12/2006 | Kalmanek et al. | 370/390 |
| 7,152,103 B1 * | 12/2006 | Ryan et al. | 709/224 |
| 7,154,858 B1 * | 12/2006 | Zhang et al. | 370/252 |
| 7,209,473 B1 * | 4/2007 | Mohaban et al. | 370/352 |

(Continued)

FOREIGN PATENT DOCUMENTS
WO    WO 99/55062    10/1999
(Continued)

OTHER PUBLICATIONS

Metz "AAA Protocols: Authentication, Authorization, and Accounting for the Internet" IEEE Internet Computing Nov./Dec. 1999, pp. 75-79.

*Primary Examiner* — Kenny S Lin
*Assistant Examiner* — Scott M Sciacca
(74) *Attorney, Agent, or Firm* — King & Spalding L.L.P.

(57) ABSTRACT

The invention relates to a method and telecommunications system (SYS) for monitoring a data flow (DAT) in a data network (WWW) between at least two telecommunications terminals (TEA, TEB), which are connected to the data network via at least one access server (AAA, AAB). When monitoring, the data flow (DAT) between the telecommunications terminals (TEA, TEB) is rerouted from the access server (AAA, AAB) via a monitoring server (PRO), which makes a copy (KOP) of the data flow (DAT) and transmits it to an evaluation unit (ASW).

30 Claims, 2 Drawing Sheets

U.S. PATENT DOCUMENTS

| | | | |
|---|---|---|---|
| 7,283,521 B1 * | 10/2007 | Ryan | 370/389 |
| 2002/0051518 A1 * | 5/2002 | Bondy et al. | 379/35 |
| 2002/0075880 A1 * | 6/2002 | Dolinar et al. | 370/401 |
| 2004/0157629 A1 * | 8/2004 | Kallio et al. | 455/466 |

FOREIGN PATENT DOCUMENTS

| | | |
|---|---|---|
| WO | WO 00/42742 | 7/2000 |
| WO | WO 00/56019 | 9/2000 |
| WO | WO 0191374 A1 * | 11/2001 |

\* cited by examiner

_US 7,979,529 B2_

METHOD AND TELECOMMUNICATIONS SYSTEM FOR MONITORING A DATA FLOW IN A DATA NETWORK

TECHNICAL FIELD OF THE INVENTION

The invention relates to a method for monitoring a data stream in a data network between at least one telecommunications terminal connected to the data network via at least one gateway, and at least one other telecommunications device, at least one authentication server being provided which is set up to perform data network access control.

The invention further relates to a telecommunications system which is set up for monitoring a data stream in a data network between at least one telecommunications terminal connected to the data network via at least one gateway, and at least one other telecommunications device, at least one authentication server being provided which is set up to perform data network access control.

BACKGROUND OF THE INVENTION

It is being increasingly demanded by legislators that operators of data networks provide functions enabling the exchange of data between individual users to be monitored if required.

Different solutions are currently available for carrying out this so-called "lawful interception" of data streams in data networks such as the Internet.

One known method consists in disposing external sniffers (analyzers) in a LAN segment of the interception subject which analyze the entire packet data stream and filter out the monitored party's traffic, duplicate it and submit it to the relevant agency. The main disadvantage of this method is that time-limited, physical intervention in the network is required. With increased mobility of the interception subject, this method is virtually unusable.

Another method used primarily for intercepting/monitoring e-mail traffic provides for the implementation on one or more mail servers of an automatic forwarding function which makes both incoming and outgoing e-mails available to the relevant authority, e.g. a law enforcement agency. Voice mail, etc. is handled similarly. With this method it is necessary for all the e-mail servers to be set up to identify an instance of interception/monitoring and forward the communication to the relevant authority, which may involve a high degree of administrative complexity.

WO 0042742 describes a monitoring method and a monitoring system for carrying out lawful interception in a packet-oriented network such as the GPRS or UMTS network. For this purpose a first network element which is controlled by a second network element is provided with data packet monitoring functionality. The intercepted (monitored) data is passed via a gateway which constitutes an interface to an intercepting authority. The main disadvantage of this method is that data streams of users that are not to be monitored are also carried by the network element, thereby considerably increasing the technical and administrative complexity of this method.

For lawful interception in the Internet see, for example, ETSI TR 101 750 V1.1.1.

Not to be disregarded are the very high costs which generally accrue for a network operator for providing the above-mentioned interception/monitoring functionality which are caused primarily by a high degree of administrative complexity.

SUMMARY OF THE INVENTION

The invention creates a simple and inexpensive means of implementing and providing an interception/monitoring function in a data network.

In one embodiment of the invention, there is a method of the type mentioned at the outset whereby at least one authentication server checks whether the data stream between the telecommunications terminal, of which there are at least one, and another telecommunications device, of which there are at least one, is to be monitored. If this is the case, a copy of the data stream is created, an identifying designation is attached to it, and the copy together with the code identifying it is sent to at least one LI server and/or directly to an analyzer unit.

An advantage of the invention is that it provides monitoring functionality on the part of the network, thereby obviating the need for intervention in the network using external tapping equipment. In addition, access to a data stream of an interception subject is possible even if said interception subject is mobile and changes location, as said interception subject has to dial in via the authentication server of a provider with the monitoring measures in place.

In a variant of the invention the copy is created by the gateway.

Another variant of the invention provides for the copy being created by a dedicated monitoring server.

The LI server advantageously establishes on the basis of the identifying designation whether at least one secondary copy of the copy is to be created and to whom the copy and/or the secondary copy, of which there are at least one, is to be delivered.

The LI server preferably creates the secondary copy, of which there is at least one, i.e. the LI server duplicates the copy according to the number of authorized agencies.

Further advantages can be achieved in that the LI server performs interface adaptation to the analyzer unit.

On the basis of a monitoring designation assigned to the telecommunications terminal, of which there is at least one, in a hidden database, the authentication server can establish whether monitoring is to take place.

The hidden database is linked to an administration database for administering user profiles and user authentication data, each user entered in the administration database being assigned a monitoring designation in the hidden database.

If user authentication data is deleted from the administration database, the assigned monitoring designations are also deleted in the hidden database.

In another variant of the invention the data stream is transmitted as a Voice over IP data stream, a call controller diverting the data stream via the monitoring server which creates the copy.

Another possibility is for the authentication server to divert the data stream via the monitoring server if monitoring is to take place.

A diversion variant consists in the data access being tunneled from the gateway through to the monitoring server.

In order to prevent loss of data if the copy cannot be delivered immediately to the relevant agency, the copy of the data stream can be buffered on the monitoring server and/or on the LI server.

In a preferred embodiment of the invention, the controller controls both the gateway and the monitoring server.

Another very advantageous embodiment of the invention provides for the monitoring server being controlled by the authentication server, of which there is at least one.

To implement the method according to the invention, a telecommunications system of the type mentioned at the outset is particularly suitable, wherein the authentication server is set up to check whether the data stream between the telecommunications terminal, of which there are at least one, and the other telecommunications device, of which there is at least one, is to be monitored. If this is the case, the telecommunications system is set up to create a copy of the data stream, to add an identifying designation to the copy and to send the copy together with the identifying designation to at least one LI server and/or directly to an analyzer unit.

In a first variant of the invention, the gateway is set up to create the copy of the data stream.

In another variant of the invention, a monitoring server is provided which is set up to create the copy.

In addition, the LI server is set up to determine, on the basis of the identifying designation, whether at least one secondary copy of the copy is to be created, and to whom the copy and/or the secondary copy, of which there is at least one, is to be delivered.

The LI server is preferably set up to create the secondary copy of which there is at least one.

Further advantages can be achieved in that the LI server is set up to perform interface adaptation to the analyzer unit.

On the basis of a monitoring designation assigned to the telecommunications terminal, of which there is at least one, in a hidden database, the authentication server can determine whether monitoring is to take place.

The hidden database and an administration database, assigned to the authentication server, for administering user profiles and user authentication data are set up to exchange data with one another, each user entered in the administration database being assigned a monitoring designation in the hidden database.

The telecommunications system can be set up to delete assigned monitoring designations in the hidden database if user authentication data is deleted from the administration database.

In an advantageous variant of the invention the data stream is transmitted as a Voice over IP data stream, a call controller being provided which is set up to divert the data stream via the monitoring server of monitoring is to take place.

Another favorable variant provides for the authentication server being set up to divert the data stream via the monitoring server if monitoring is to take place.

Further advantages can be created by setting up the telecommunications system to tunnel data access from the gateway through to the monitoring server.

In order to guard against loss of data, the monitoring server and/or the LI server can be set up to buffer the copy of the data stream.

In addition, the call controller can be set up to control both the gateway and the monitoring server.

In another variant, the authentication server is set up to control the monitoring server. The monitoring server preferably has the functionality of a proxy server.

BRIEF DESCRIPTION OF THE DRAWINGS

The invention together with further advantages will now be described with reference to a number of exemplary embodiments which are not to be taken in a limiting sense, as illustrated in the accompanying drawings.

DETAILED DESCRIPTION OF THE INVENTION

Figure 1:
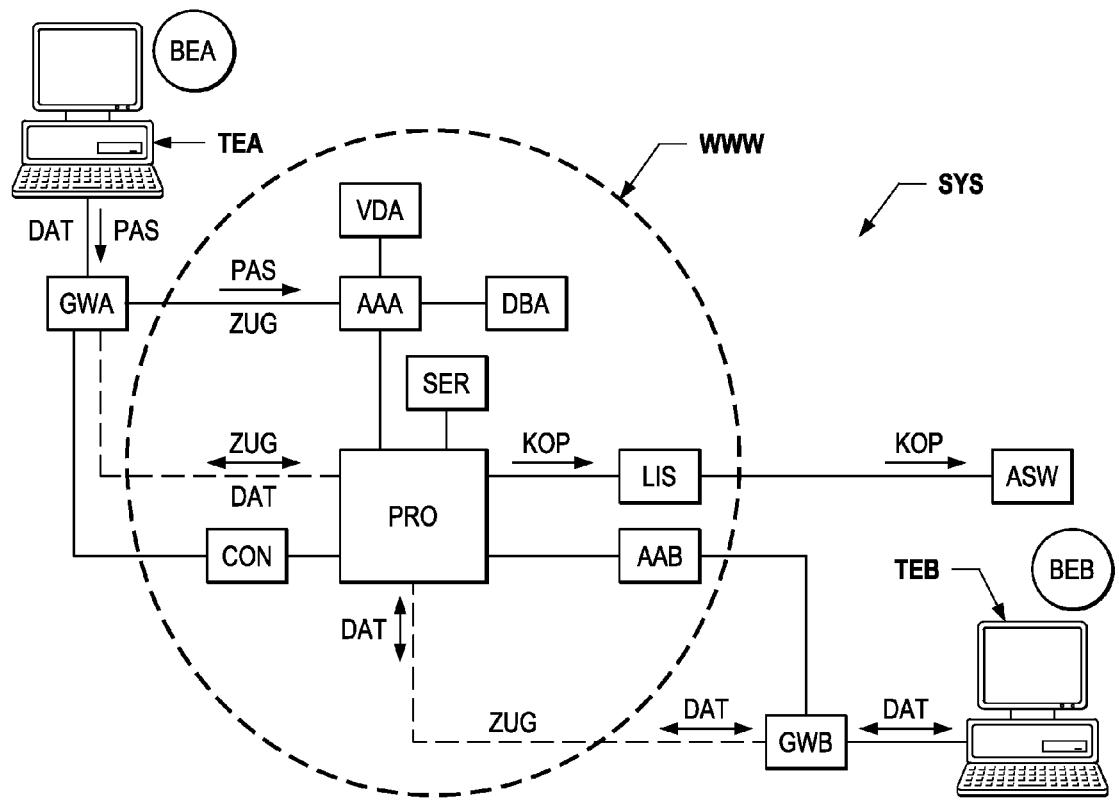
FIG. 1 schematically illustrates a telecommunications system according to the invention, FIG. 2a schematically illustrates a copy of a data stream with an identifying designation, FIG. 2b schematically illustrates the identifying designation from FIG. 2a in greater detail, and FIG. 3 schematically illustrates an exemplary sequence of the method according to the invention.

As shown in FIG. 1, every user BEA, BEB of a telecommunications systems SYS according to the invention wishing to have access to a data network WWW, e.g. the Internet, via his telecommunications terminal TEA or telecommunications device TEB must dial in via a gateway GWA, GWB or log on to an access server AAA. In this document, telecommunications device is taken to mean any type of telecommunications terminal, such as a PC connected to the data network, or even servers present in the data network WWW.

The access server AAA, AAB can be implemented as an AAA server or as a remote authentication dial-in user service server, or RADIUS server for short. In order to obtain data access ZUG to the data network WWW, it is necessary for each user to authenticate himself.

Authentication of a user BEA, BEB can take place via entry of a password PAS or of a user ID, e.g. the user's name.

On the basis of the identification result, the access server AAA, AAB decides whether data access ZUG to the data network WWW is granted or refused.

Authentication of the user BEA, BEB on the part of the access server AAA can be performed by interrogation of an administration database VDA in which the user data is administered.

If the authentication result is positive, a hidden database is interrogated in which a monitoring designation UWD is assigned to every user entered in the administration database. If the monitoring designation UWD indicates that a data stream DAT between the telecommunications terminal TEA of the user BEA and another telecommunications terminal is to be monitored, a copy KOP of the data stream DAT is made.

The copy KOP of the original data stream DAT can be created e.g. by the gateway GWA assigned to the telecommunications terminal TEA or by a dedicated monitoring server PRO.

If the monitoring server PRO creates the copy of the original data stream DAT, the data stream DAT is diverted via the monitoring server PRO, said server preferably having proxy functionality. The monitoring server PRO only differs from a proxy server in that the monitoring server PRO is set up to create the copy KOP of a data stream DAT passing (diverted) via it and to provide said copy with an accompanying identifying designation IDK (FIG. 2), e.g. the IP address or an encrypted designation of the user to be monitored, and transmit it to a "lawful interception" (LI) server LIS, the original data stream being routed onward to the destination address specified by the user.

If the gateway GWA creates the copy KOP, the functionality just described of copying and forwarding the copy KOP to the LI server or of routing the original data stream DAT according to the user-specified destination address is implemented in the gateway GWA.

If monitoring is to take place, data access ZUG to the data network WWW can be via the gateway and the monitoring server PRO for the user BEA to be monitored.

Diversion of the data stream DAT to the monitoring server PRO can take place by means of tunneling, e.g. in accordance with the L2T protocol specified in RFC 2661.

Another possibility for diverting the data stream DAT via the monitoring server PRO consists in assigning the monitoring server PRO an address in the data network, or an IP address in the case of the Internet. This address can be stored in a memory unit of the access server AAA, AAB, the data stream DAT being forwarded, if monitoring is to take place, to the address of the monitoring server PRO e.g. in accordance with the TCP/IP protocol.

The monitoring server PRO then creates, as described above, a copy KOP of the data stream DAT diverted via it and transmits this copy KOP to an LI server which decides, on the basis of the identifying designation IDK attached to the copy, what is to happen with said copy KOP, e.g. whether further copies i.e. secondary copies WKO of the copy are to be created or to which analyzer unit(s) the copy or copies are to be sent.

Further processing and analysis of the copy KOP then takes place in the analyzer unit ASW, e.g. a law enforcement agency PC equipped for this purpose.

The LI server LIS is generally an arrangement of a plurality of workstations. As mentioned above, its purpose is to receive the copy KOP of the data stream DAT, to analyze the identifying designation IDK attached to the copy KOP by the monitoring server, and if necessary to make additional copies WKO of the copy KOP and deliver them to the relevant agencies.

The LI server is set up to perform interface adaptation to different analyzer units ASW of the relevant agencies. For example, it may be necessary to establish two H.323 connections to a known time division multiplex (TDM) interface of the monitoring authority. Another possibility consists in delivering the copy to the monitoring authority via an IP interface.

The information required by the LI server LIS for forwarding the copy to the relevant agency or the analyzer unit ASW can be stored on the part of the relevant agency in a database LID.

Another possibility consists in the copy KOP and associated identifying designation IDK being delivered by the monitoring server PRO or gateway GWA directly to the analyzer unit ASW.

When the copy KOP of the data stream DAT has been created, the original data stream DAT is routed onward by the monitoring server PRO in the usual way, e.g. according to the TCP/IP protocol, to the second user BEB or the telecommunications device TEB, SER.

Figure 2A:
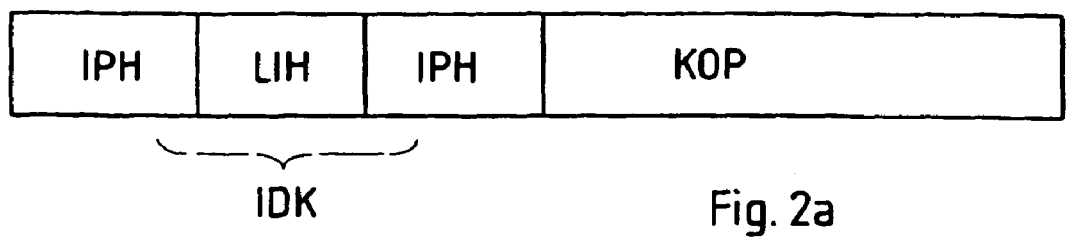
Figure 2B:
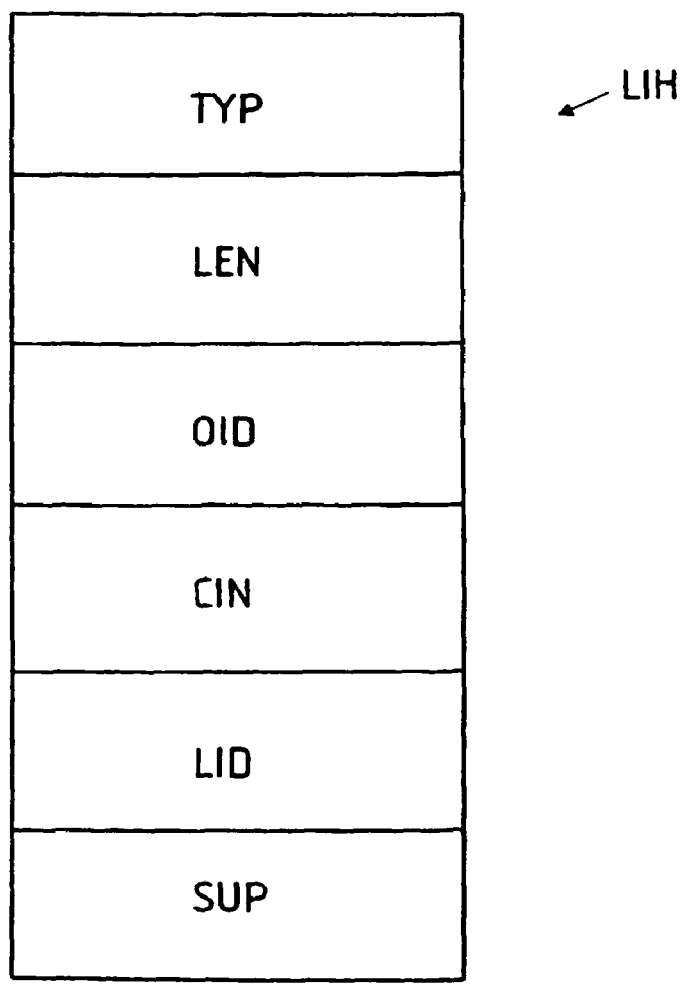

As shown in FIG. 2a, the copy KOP of the data stream DAT is prefixed by an identifying designation IDK as a header. The identifying designation can have at least one IP header IPH, e.g. the IP address of the monitored user BEA. In addition, a special LI header LH containing information relating to onward data transmission for the LI server can be provided (FIG. 2b). For example, the first line can contain the type TYP of communication, e.g. whether it is a voice message or an "intercepted" e-mail. A subsequent line can contain the length LEN of the header, while a third line can contain an operator ID OID in accordance with ETSI standard ES 201671. A call identification number CIN can be used to identify an "intercepted" user BEA, whereas an authorized agency identifier LID serves to identify the agency to which the copy KOP is to be delivered. Supplementary information SUP can if necessary be appended to the information just described.

Figure 3:
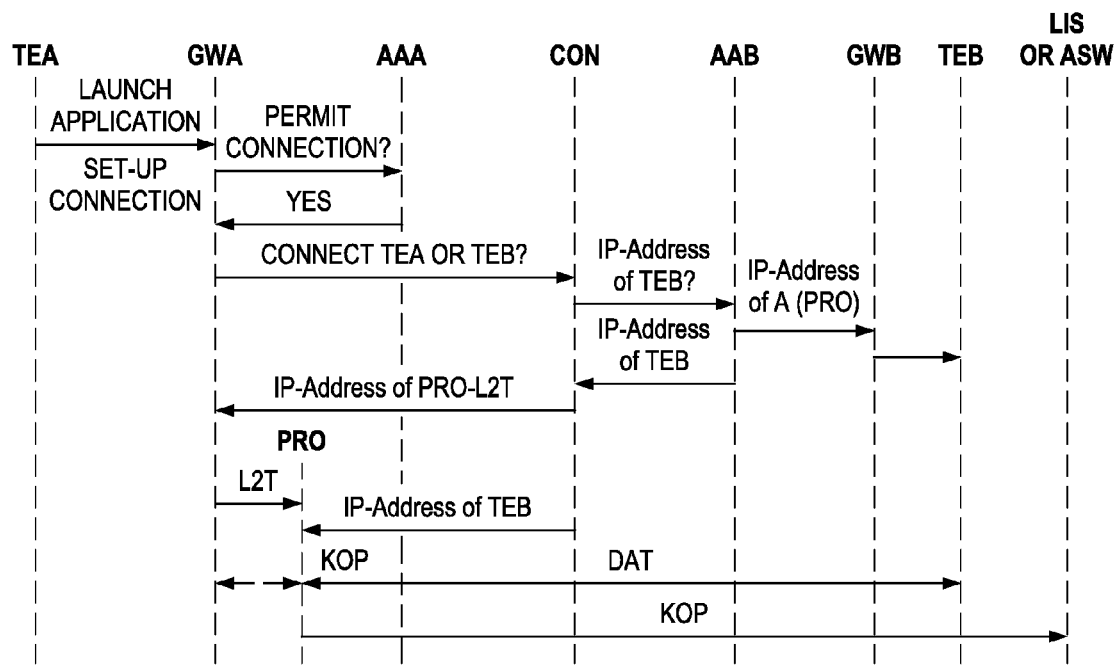

As shown in FIG. 3, in the case of a voice transmission using the Voice over IP protocol, a corresponding application APP is launched on the telecommunications terminal TEA of the caller BEA which then establishes a connection to a first access server AAA via a first gateway GWA. This access server AAA checks which party wants to use the voice transmission service, and whether said party is authorized to use this service. For this purpose an H.323 or RADIUS communication takes place between the gateway GWA and the access server AAA.

If the calling user BEA is entitled to use the voice service, the access server AAA verifies, on the basis of authentication of this user BEA, whether the exchange of data between the caller and a called party is to be checked.

When access checking is complete, the call controller CON ascertains the IP address of the called telecommunications terminal TEB by means of communication with a second access server AAB and initiates signaling traffic to this telecommunications terminal TEB via another gateway GWB.

If the caller is now to be monitored, the controller CON then establishes the connection from gateway GWA to the called telecommunications terminal TEB not directly, as is normally the case, but loops in the monitoring server PRO, i.e. the connection from the first telecommunications terminal TEA to the second telecommunications terminal TEB is broken down into two sections, namely into the section from the first telecommunications terminal TEA to the monitoring server PRO and the section from the monitoring server PRO to the second telecommunications terminal TEB.

The controller CON normally controls the first gateway GWA. However, as access to the data network WWW is extended to the monitoring server PRO because of the monitoring, and it is only there that normal routing for data stream DAT of the user BEA actually begins, the controller CON is set up to perform a "handover" from the gateway to the monitoring server, i.e. the controller CON is informed by the first access server AAA that monitoring is to take place and the data access ZUG of the telecommunications terminal TEA to be monitored must be tunneled through to a monitoring server PRO. From now on, the controller regards the monitoring server PRO as a "new" first gateway GWA and controls this server as if it were the gateway GWA. If monitoring is to take place, the call controller CON therefore behaves as if the monitoring server PRO were the gateway GWA, and this applies to both the calling and the called end.

The monitoring server PRO then creates, as described above, a copy KOP of the data stream DAT between the two telecommunications terminals TEA, TEB. To create the copy KOP, the original data stream DAT is duplicated in the monitoring server PRO. After duplication by the monitoring server PRO, the original data stream DAT is routed onward to the second telecommunications terminal TEB, whereas the copy KOP of the data stream DAT is transmitted as described above to an LI server or an analyzer unit ASW.

The monitoring server PRO as well as the LI server LIS can be set up to buffer the copy KOP in order to prevent loss of data in the event of immediate delivery to the analyzer unit ASW being impossible.

In order to implement interception without noticeable impairment of the quality and speed of the original data stream DAT, the section between the monitoring server PRO and the gateway GWA must be short, for which reason it is advantageous if a large number of monitoring servers PRO are disposed in the data network WWW.

If the called user BEB is to be monitored, the method is essentially as described above, the second access server AAB being able to carry out authentication on the basis of the IP address of the called party BEB and to divert the data stream DAT via the monitoring server PRO.

For the purpose of authentication of the called party BEB on the basis of his IP address, the second access server AAB can have a database DAB containing the IP address of the called party and an entry indicating whether said party is to be monitored.

The instruction to monitor the user BEA is issued by an agency authorized to monitor communications and entered in the hidden database DBA.

If the monitored user BEA launches a data transmission application in the data network WWW on his telecommunications terminal, the user is authenticated and it is established whether monitoring is to take place, as described above.

If monitoring is to take place, the address of the monitoring server PRO is sent to the calling end (A) instead of to the address of the called user BEB or of a telecommunications device TEB SER, such as a server on which a homepage or other data is stored. The called-end gateway GWB receives from the authentication server AAA or call controller CON the network address of the monitoring server PRO instead of the network address of the calling user BEA.

The monitoring server PRO is informed by the authentication server AAA or call controller CON that monitoring is to take place. All the information required for monitoring and connection, e.g. "connect the calling end to the called end" and similar information can be sent from the authentication server AAA or call controller CON to the monitoring server PRO by means of H.248 transmission.

In the monitoring server, the data stream DAT between the calling and called user or server is duplicated as mentioned above, the duplicated data being provided with an identifying designation IDK. The copy KOP thus created is transmitted to the LI server in a subsequent sequence.

The monitoring server acts as a proxy server for the original data stream and only connects the calling end to the called end.

Another variant of the invention provides for the calling end to receive the network address of the called end from the authentication server AAA or call controller CON, the calling-end gateway being requested by H.248 transmission to tunnel all the data traffic originating from the user BEA to the monitoring server. In this event the address of the monitoring server PRO instead of the network address of the calling end is transmitted by the call controller to the called end whose network address is known.

The monitoring server PRO receives from the call controller the corresponding tunneling information and connects the calling end to the called end.

The advantages of tunneling are that the address modifications necessary for diverting the data stream via the monitoring server PRO are invisible to the monitored user BEA.

If the monitoring server PRO is informed by the authentication server AAA, AAB or the call controller via an H.248 communication that a data stream DAT is being diverted, it can transmit a start message to the LI server causing the latter to request the necessary data from the LI database LID and make it available as soon as the copy KOP arrives.

When the data interchange to be monitored is complete, the call controller CON informs the monitoring server PRO that it must terminate communication with the LI server in respect of specific monitoring. On receiving a termination message from the monitoring server PRO, the LI server can again delete the data coming from the LI database and discontinue communication with the relevant agencies.

What is claimed is:

1. A method for monitoring a data stream in a data network between a first telecommunications terminal connected to the data network via at least one gateway, and a second telecommunications terminal, at least one authentication server being provided which is set up to perform access control to the data network, comprising:
   determining whether the first telecommunications terminal or the second telecommunications terminal is authorized to access the data network by checking a non-hidden administration database including data indicating whether each of the first and second telecommunications terminals is authorized to access the data network;
   in response to determining that the first telecommunications terminal or the second telecommunications terminal is authorized to access the data network, checking a hidden database for a monitoring designation assigned to the first or the second telecommunications terminal to determine whether the data stream between the first telecommunications terminal and the second telecommunications terminal is to be monitored;
   wherein the non-hidden administration database indicating whether each telecommunications terminal is authorized to access the data network and the hidden database indicating a monitoring designation for each telecommunications terminal are connected to each other for exchanging data with each other;
   if it is determined that the data stream is to be monitored, routing the data stream between the first and second telecommunications terminals via a monitoring server for copying the data stream;
   if it is determined that the data stream is not to be monitored, routing the data stream between the first and second telecommunications terminals without routing the data stream via said monitoring server;
   wherein during monitoring by the monitoring server, a copy of the data stream is created to which an identifying designation is added, wherein the identifying designation includes an IP address or an encrypted designation of the data stream as well as information relating to onward data transmission, and the copy together with the associated identifying designation is transmitted to at least one LI server and/or directly to an analyzer unit.

2. The method according to claim 1, wherein the LI server establishes on the basis of the identifying designation whether at least one secondary copy of the copy is to be created, and to whom the copy and/or the secondary copy, of which there is at least one, is/are to be delivered.

3. The method according to claim 2, wherein the LI server creates the secondary copy, of which there is at least one, of the copy.

4. The method according to claim 1, the LI server performs interface adaptation to the analyzer unit.

5. The method according to claim 1, wherein in the event of deletion of user authentication data in an administration database, assigned monitoring designations are deleted in the hidden database.

6. The method according to claim 5, wherein a call controller diverts the data stream via the monitoring server which creates the copy.

7. The method according to claim 6, wherein the at least one authentication server controls the monitoring server.

8. The method according to claim 1, wherein the data stream is transmitted as a Voice over IP data stream.

9. The method according to claim 8, wherein the controller controls both the gateway and the monitoring server.

10. The method according to claim 1, wherein, if monitoring is to take place, the authentication server diverts the data stream via the monitoring server.

11. The method according to claim 1, wherein the data access is tunneled from the gateway through to the monitoring server.

12. The method according to claim 1, wherein the copy of the data stream is buffered on the monitoring server.

13. The method according to claim 1, wherein the copy of the data stream is buffered on the LI server.

14. The method according to claim 1, wherein the identifying designation is a header comprising the IP address of the telecommunication terminal and the IP address of the other telecommunication terminal and information relating to onward data transmission.

15. The method according to claim 1, wherein the information relating to onward data transmission comprises at least one information selected from the group consisting of information about the type of communication, information about the length of the header, information about an operator ID, and information about a call identification number and an authorized agency identifier.

16. The method according to claim 1, wherein the information relating to onward data transmission comprises information about the type of communication, information about the length of the header, information about an operator ID, and information about a call identification number an authorized agency identifier.

17. A telecommunications system which is set up for monitoring a data stream in a data network between a first telecommunications terminal connected to the data network via at least one gateway, and a second telecommunications terminal, at least one authentication server being provided which is configured to perform access control to the data network,
the authentication server configured to:
determine whether the first telecommunications terminal or the second telecommunications device is authorized to access the data network by checking a non-hidden administration database including data indicating whether each of the first and second telecommunications terminals is authorized to access the data network, and
in response to determining that the first telecommunications terminal or the second telecommunications device is authorized to access the data network, check a hidden database for a monitoring designation assigned to the first or the second telecommunications terminal to determine whether the data stream between the first telecommunications terminal and the second telecommunications device is to be monitored;
wherein the non-hidden administration database indicating whether each telecommunications terminal is authorized to access the data network and the hidden database indicating a monitoring designation for each telecommunications terminal are connected to each other for exchanging data with each other;
a controller configured to:
route the data stream between the first and second telecommunications terminals via a monitoring server for monitoring the data stream if it is determined that the data stream is to be monitored;
route the data stream between the first and second telecommunications terminals without routing the data stream via said monitoring server if it is determined that the data stream is not to be monitored;
during monitoring, the telecommunications system is configured to create a copy of the data stream and to add an identifying designation to the copy and to transmit the copy and associated identifying designation to at least one LI server and/or directly to an analyzer unit, wherein the identifying designation includes an IP address or an encrypted designation of the data stream as well as information relating to onward data transmission.

18. The telecommunications system according to claim 17, wherein the LI server is configured to establish, on the basis of the identifying designation, whether at least one secondary copy of the copy is to be created, and to whom the copy and/or the secondary copy, of which there is at least one, is/are to be delivered.

19. The telecommunications system according to claim 18, wherein the LI server is configured to create the secondary copy, of which there are at least one, of the copy.

20. The telecommunications system according to claim 17, wherein the L1 server is configured to perform an interface adaptation to the analyzer unit.

21. The telecommunications system according to claim 17, wherein the telecommunications system is configured to delete assigned monitoring designations in the hidden database when user authentication data being deleted in the administration database.

22. The telecommunications system according to claim 17, wherein the data stream is a Voice over IP data stream.

23. The telecommunications system according to claim 22, wherein a call controller is provided which is configured to divert the data stream via the monitoring server if monitoring is to take place.

24. The telecommunications system according to claim 23, wherein the call controller is configured to control both the gateway and the monitoring server.

25. The telecommunications system according to claim 17, wherein the authentication server is configured to divert the data stream via the monitoring server if monitoring is to take place.

26. The telecommunications system according to claim 25, wherein the authentication server is configured to control the monitoring server.

27. The telecommunications system according to claim 17, wherein the telecommunications system is configured set up to tunnel the data access from the gateway through to the monitoring server.

28. The telecommunications system according to claim 17, wherein the monitoring server is configured to buffer the copy of the data stream.

29. The telecommunications system according to claim 17, wherein the LI server is configured to buffer the copy of the data stream.

30. The telecommunications system according to claim 17, wherein the monitoring server has proxy server functionality.

* * * * *